United States Patent [19]

Chadwick et al.

[11] Patent Number: 5,132,379
[45] Date of Patent: Jul. 21, 1992

[54] SOLID ALPHA-OLEFIN POLYMERIZATION CATALYST COMPOUNDS

[75] Inventors: John C. Chadwick; Bart J. Ruisch, both of Amsterdam, Netherlands

[73] Assignee: Shell Research Limited, United Kingdom

[21] Appl. No.: 765,885

[22] Filed: Sep. 26, 1991

Related U.S. Application Data

[62] Division of Ser. No. 513,979, Apr. 24, 1990, Pat. No. 5,061,666.

[30] Foreign Application Priority Data

May 15, 1989 [GB] United Kingdom ............... 8911074

[51] Int. Cl.$^5$ .............................................. C08F 4/06
[52] U.S. Cl. .................................. 526/123; 526/124; 502/107; 502/120; 502/127
[58] Field of Search ............................... 526/124, 123

[56] References Cited

U.S. PATENT DOCUMENTS 4,612,299  9/1986  Arzoumanidis et al. ............ 502/120

Primary Examiner—Patrick P. Garvin
Assistant Examiner—Brent M. Peebles

[57] ABSTRACT

A process for preparing a solid catalyst component which comprises halogenating a magnesium compound in the formula $MgRR^1 \cdot nCO_2$ in which R and $R^1$ are the same or different alkoxy or phenoxy groups and n is a number of from 0 to 2 with a halide of tetravalent titanium in the presence of dialkylester of a dihydric aromatic carboxylic acid and an inert hydrocarbon diluent by reacting at a temperature of from 120° to 136° C. and recovering the solid reaction product from the reaction mixture.

5 Claims, No Drawings

SOLID ALPHA-OLEFIN POLYMERIZATION CATALYST COMPOUNDS

This is a divisional of copending application Ser. No. 07/513,979 filed on Apr. 24, 1990, now U.S. Pat. No. 5,061,666.

This invention relates to solid alpha-olefin polymerization catalyst components and a process for preparing the same.

It is known to provide alpha-olefin polymerization catalysts by combining a solid component comprising at least magnesium, titanium and halogen with an activating organoaluminium compound. These may be referred to as supported coordination catalysts or catalyst systems. The activity and stereospecific performance of such compositions are generally improved by incorporating an electron donor in the solid component—this electron donor sometimes being referred to as "inner donor"—and by employing as a third catalyst component an electron donor which may be complexed in whole or in part with the activating organoaluminium compound, the latter electron donor sometimes being referred to as "outer donor" or "selectivity control agent" (SCA).

Supported coordination catalysts of this type are generally able to produce olefin polymers in high yield and, in the case of catalysts for polymerization of propylene or higher alpha-olefins, with high selectivity to stereoregular polymer cf. GB 1,389,890 and GB 1,559,194. However, they tend to lose their advanced polymer productivity rate after a fairly short period of time. This negative phenomenon is known as "decay", c.f. L. Luciani, Angew. Makromol. Chemie, 94 (1981), p. 63–89, FIGS. 14 and 15.

EP 45,977 is concerned with a catalyst system having a reduced decay rate. That system comprises a solid catalyst component based on magnesium halide, titanium halide and di-isobutyl phthalate and a co-catalyst comprising trialkyl aluminium which is complexed with i.a. phenyltriethoxysilane. The hygroscopic character of the magnesium dichloride starting material used to produce the solid catalyst component is one of the disadvantages of that known catalyst system. The problems related to hygroscopic nature of the starting material are avoided when employing the solid catalyst system known from EP 19,330. In that event the starting material is magnesium dialkoxide or di-phenoxide which is converted into magnesiumdichloride by halogenating with titanium tetrachloride in the presence of an electron donor and a halohydrocarbon. The latter serves to reduce by extraction the content of soluble $TiCl_4$—electron donor complex in the solid catalyst component so produced, the said reduction being associated with an improvement in catalytic performance. This known catalyst is once again of the fast-decaying type and the prescribed need to employ halohydrocarbons will pose waste-stream disposal problems in catalyst manufacture. Surprisingly, it has been found that by effecting the aforesaid known halogenation method at temperatures markedly higher than those known from EP 19,330, it is possible to prepare solid catalyst components from magnesium alkoxide or phenoxide starting materials which in combination 1) provide a solution to the decay problem; 2) do away with the halohydrocarbon disposal problem and 3) which in terms of polymerization performance (polymer yield) are dramatically superior to the catalysts disclosed in EP 19,330.

The present invention provides a process for preparing a solid catalyst component which comprises halogenating a magnesium compound of the formula $MgRR^1 \cdot nCO_2$ in which R and $R^1$ are the same or different alkoxy or phenoxy groups and n is an integer of from 0 to 2 with a halide of tetravalent titanium in the presence of a dialkylester of a dihydric aromatic carboxylic acid and an inert hydrocarbon diluent by reacting at a temperature of from 120° to 136°C. and recovering the solid reaction product from the reaction mixture.

In the halogenation reaction of the invention suitable magnesium compounds to be employed as starting materials are compounds like magnesium dimethoxide, magnesium diethoxide, methoxy magnesium phenoxide, magnesium diphenoxide, methoxy magnesium ethoxide, magnesium dibutoxide and isopropoxy magnesium phenoxide. The aforesaid phenoxy groups may comprise one or more halogen or alkoxy substituents. All of the just listed compounds are compounds of the general formula marked above, in which n equals zero. Magnesium diethoxide and magnesium diphenoxide are preferred starting materials.

In another preferred group of starting materials n does not equal zero. In such compounds the $CO_2$ moiety is predominantly present in the form of at least one carbonate linkage

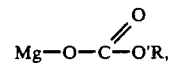

in which 'R stands for alkyl, aryl, dihalo- or dialkoxy substituted phenyl. They can be prepared by contacting a dispersion of the defined MgRR' compound in a suitable diluent with carbon dioxide. It is preferred that the carbon dioxide be 99.8% or more pure $CO_2$. Typically, the $CO_2$ is bubbled through the dispersion of magnesium compound in a diluent. Since the reaction is exothermic, one may continue bubbling the $CO_2$ until the exotherm has ended and the solid compound dissolves. The diluent employed may be any material in which the carbonated magnesium compound is soluble at desired conditions. Preferred diluents are alcohols. However, other polar solvents such as acetone or dimethyl formamide (DMF) may be used, as well as mixed solvents. Preferably, when an alcohol is employed it is used in conjunction with a magnesium compound containing two of the same groups, i.e. an alcohol of formula ROH is used with a magnesium compound of formula $Mg(OR)_2$. For example, if magnesium diethoxide is used, then it is preferred that the diluent be ethanol. The desired magnesium compound can be recovered in solid form from the solution by spray-drying to obtain adequate morphology control.

In the halogenation with a halide of tetravalent titanium, the magnesium compounds are preferably reacted to form a magnesium halide in which the atomic ratio of halogen to magnesium is at least 1.2/1. Better results are obtained when the halogenation proceeds more completely, i.e. yielding magnesium halides in which the atomic ratio of halogen to magnesium is at least 1.5/1. The most preferred reactions are those leading to completely halogenated reaction products, i.e. magnesium dihalides. Such halogenation reactions are suitably effected by employing a molar ratio of magnesium compound to titanium compound of 0.0005:1 to 2:1, preferably 0.01:1 to 1:1. In this invention the halogenation reaction is conducted in the additional presence of a defined electron donor. A liquid inert hydrocarbon diluent is preferably also present. Preferred diluents are aromatic hydrocarbons, such as xylene or ethylbenzene.

Suitable halides of tetravalent titanium include aryloxy or alkoxy-di- and trihalides, such as dihexanoxy-titanium dichloride, diethoxy-titanium dibromide, isopropoxy-titanium tri-iodide and ethoxytitanium trichloride, and titanium tetrahalides. The tetrahalides are preferred, most preferred is titanium tetrachloride.

The electron donors may be chosen from the esters of phthalic acid, terephthalic acid, 1,4-naphthalene dicarboxylic acid, naphthalic acid and 1,2- or 2,3-naphthalene dicarboxylic acid. Phthalic acid esthers and in particular the $C_3$ to $C_{10}$ alkyl esters thereof are preferred. Thus, very good esters are di-isoheptyl-, di-2-ethylhexyl-, di-isooctyl-, di-n-pentyl-, di-n-nonyl-, di-2-methyl-3-ethylpentyl-, di-isobutyl- and di-n-butyl-phthalate.

The halogenation proceeds under formation of a solid reaction product which may be isolated from the liquid reaction medium by filtration, decantation or another suitable method and may be subsequently washed with an inert hydrocarbon diluent, such as n-hexane or iso-octane, to remove any unreacted material, including physically absorbed aromatic hydrocarbon diluent.

Subsequent to halogenation, the solid product may be contacted with a halide of tetravalent titanium, e.g. a dialkoxy-titanium dihalide, a phenoxy titanium-trihalide, a dichloro-phenoxy titaniumtrihalide or titanium tetrahalide in order to increase the titanium content of the solid catalyst component. This increase should preferably be sufficient to achieve a final atomic ratio of tetravalent titanium to magnesium in the solid catalyst component of from 0.005:1 to 3.0:1, particularly of from 0.02:1 to 1.0:1. To this purpose the contacting with the halide of tetravalent titanium is most suitably carried out at a temperature of from 60°C. to 136°C. for 0.1-6 hours. Particularly preferred contacting temperatures are from 120°C. to 136°C. and the most preferred contacting periods are 0.2 to 2 hours. This treatment may be carried out in repeated contacts of the solid with separate portions of the halide of tetravalent titanium, optionally in the presence of an inert hydrocarbon diluent.

Three basic features distinguish the present novel preparation process from the prior art method known from Ep 19,330
  a) the use of different electron donors;
  b) the use of higher temperature during halogenation; and
  c) the absence for the need for copresence of a halohydrocarbon during halogenation.

Whilst the presence of minor amounts of halohydrocarbon during halogenation in accordance with this invention can be tolerated, no beneficial effects are obtained therewith. Consequently, in order to simplify the working up, recycling or disposal of titaniumhalide waste-streams, it is preferred to carry out the halogenation in the absence of halohydrocarbon.

In the end, the catalyst component is suitably washed to remove unreacted titanium compound. The titanium content of the final, washed solid catalyst component is suitably 1.5 to 3.6 percent by weight, but can be up to 4.5 percent by weight. The material used to wash the catalyst component suitably is an inert, light hydrocarbon liquid. Preferred light hydrocarbon liquids are aliphatic, alicyclic and aromatic hydrocarbons. Examples of such liquids include iso-pentane, n-hexane, iso-octane and toluene, with iso-pentane being most preferred.

For the polymerization of alpha-olefins the solid catalyst component is employed in conjunction with an organo aluminium compound and, optionally, any one of the electron donors set out hereinbefore. More suitable electron donors are organic silicon compounds including alkoxysilanes and aryloxysilanes of the general formula $S^1Si(OS^2)^{4-n}$ where n is between zero and three. $S^1$ is a hydrohydrocarbon group or a halogen atom and $S^2$ is a hydrocarbon group. Specific examples include trimethylmethoxysilane, diphenyldimethoxysilane, dimethyldimethoxysilane and phenyltriethoxysilane. A sterically hindered amine such as 2,2,6,6-tetramethylpiperidine (TMP) may also be used. Preferred selectivity control agents are TMP, phenyltriethoxysilane and diphenyldimethoxysilane.

The organoaluminium compound to be employed as cocatalyst may be chosen from any of the known activators in olefin polymerization catalyst systems comprising a titanium halide. While trialkylaluminium compounds, dialkylaluminium halides and dialkylaluminium alkoxides may be used, trialkylaluminium compounds are preferred, particularly those wherein each of the alkyl groups has 2 to 6 carbon atoms, e.g. triethylaluminium, tri-n-propylaluminium, triisobutylaluminium, triisopropylaluminium and dibutyl-n-amylaluminium.

Preferred proportions of selectivity control agent, employed separately, in combination with, or reacted with an organoaluminium compound, are from 0.005 to 1.5, particularly from 0.1 to 0.8, calculated as mol per mol aluminium compound. Preferred proportions of selectivity control agent calculated as mol per mol titanium are from 0.1 to 50, particularly from 0.5 to 20.

Proportions of electron donor contained in the solid catalyst component, calculated as mol per mol of magnesium, are suitably from 0.01 to 10, e.g. from 0.05 to 5.0 and especially from 0.05 to 0.5.

To prepare the final polymerization catalyst composition, the solid catalyst component, organoaluminium compound and selectivity control agent, if used, may be simply combined, most suitably employing a molar ratio to produce in the final catalyst an atomic ratio of aluminium to titanium of from 1:1 to 150:1. The catalysts of this invention tend to exhibit very good activity at low Al:Ti ratios, e.g. below 80:1. It may, however, be advantageous under some conditions to employ at higher Al:Ti ratios even up to 500:1. Increasing the Al:Ti ratio tends to increase catalyst activity at the expense of increased catalyst residue in the unextracted product. These factors, as well as the desired level of isotacticity, will be considered in selecting the Al:Ti ratio for any given process and desired product. In general, Al:Ti atomic ratios of from 30:1 to 100:1 will be preferred.

The present invention is also concerned with a process for polymerizing an alpha-olefin, e.g. 1-hexene, 1-butylene or more preferably propylene. These polymerizations may be carried out by any of the conventional techniques, such as gas phase polymerization or slurry polymerization using liquid monomer or an inert hydrocarbon diluent as liquid medium.

The invention is further illustrated by working examples.

EXAMPLE 4 g Magnesium-diethoxide was heated during 1.5 hr at varying temperature under stirring with 80 ml TiCl$_4$/aromatic solvent mixture (v:v=50:50) and 2 ml diisobutyl phthalate (ester/Mg molar ratio 0.22). The liquid phase was removed by filtration while hot, and two additional treatments with TiCl$_4$/solvent were carried out, each during 0.5 hr and at the same temperature as employed before. The final solid product was washed with 50 ml isooctane (6x) and kept for further use as a suspension in mineral oil.

Propylene was polymerized in a liquid bulk reaction (propylene monomer) under the following standard conditions: T=67°C., period 1 hr, pressure 700 kPa, TEA/Ti molar ratio 150:1 (TEA=triethylaluminium), TEA/TMP molar ratio 2.5:1 (TMP=2,2,6,6-tetramethylpiperidine), H$_2$ concentration 1.5% vol in gas cap, solid catalyst component:20 mg.

With various inert hydrocarbon diluents and different reaction temperatures for halogenation the following polymerization data marked in Table I, in terms of polymer yield (kg polymer per g cat. component) and xylene solubles (XS, % w), were obtained.

TABLE I

| Diluent | T, °C | Yield | XS |
| --- | --- | --- | --- |
| Xylene | 120 | 32 | 4.4 |
| " | 130 | 48 | 4.5 |
| " | 135 | 38 | 5.5 |
| Ethylbenzene | 120 | 31 | 4.8 |
| " | 130 | 39 | 3.9 |
| " | 135 | 36 | 5.5 |
| monochlorobenzene* | 100 | 23 | 5.8 |
| monochlorobenzene** | 80 | 18 | 6.3 |

TABLE I-continued

*for comparison, solid component having been prepared by substituting monochlorobenzene for xylene in both halogenation and each of the subsequent TiCl$_4$ treatments, all other conditions left unchanged.
**for comparison, as in * but now employing phenyltriethoxysilane (PTS) in stead of TMP in cocatalyst (TEA/PTS molar ratio 10:1).

We claim:

1. A process for the polymerization of an alpha-olefin comprising polymerizing said alpha-olefin under polymerization conditions with a polymerization catalyst prepared by the method of halogenating a magnesium compound of the formula MgRR$^1$·CO$_2$ in which R and R$^1$ are the same of different alkoxy or phenoxy groups and n is a number of from 0 to 2 with a halide of tetravalent titanium in the presence of a dialkylester of a dihydric aromatic carboxylic acid and an inert hydrocarbon diluent at a temperature of from 120° to 136° C. and recovering the solid reaction product from the reaction mixture.

2. A process as claimed in claim 1 wherein the dialkyl ester is a C$_3$ to C$_{10}$ alkyl ester.

3. A process as claimed in claim 1 wherein the aromatic carboxylic acid is phthalic acid.

4. A process as claimed in claim 1 wherein the halogenation reaction is effected in the presence of a liquid aromatic hydrocarbon.

5. A process as claimed in claim 4 wherein the reaction is effected in the absence of a halohydrocarbon.

* * * * *